Sept. 9, 1924.  1,508,320

H. HEIDE

SUSPENDER CLAMP

Filed May 24, 1922  2 Sheets-Sheet 1

Inventor:
Henry Heide,
By his Attorney,
Geo. Wm Midtt.

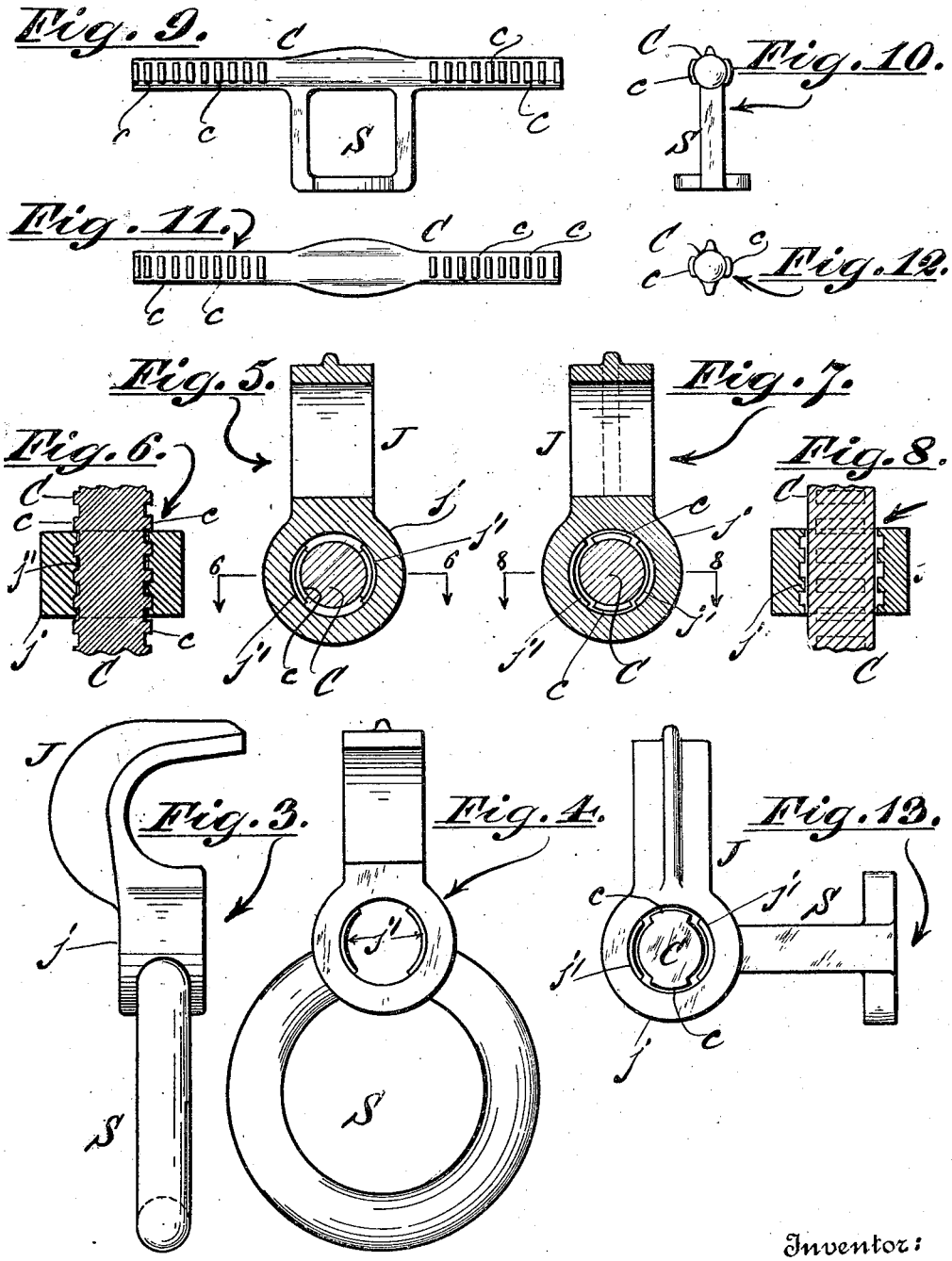

Patented Sept. 9, 1924.

1,508,320

UNITED STATES PATENT OFFICE.

HENRY HEIDE, OF NEW YORK, N. Y.

SUSPENDER CLAMP.

Application filed May 24, 1922. Serial No. 563,239.

*To all whom it may concern:*

Be it known that I, HENRY HEIDE, a citizen of the United States, and a resident of the borough and county of Bronx, city and State of New York, have invented certain new and useful Improvements in Suspender Clamps, of which the following is a specification.

My improvements relate to means for attaching suspenders of various kinds to beams of buildings and other structures, and supports, either temporarily or permanently, according to the exigencies or requirements of specific use, and are designed to afford a simple, inexpensive, beam clamping device, for the support of a hanger for a pipe, or any other appurtenance to be suspensively sustained,—the invention consisting in the specific construction, combination and arrangement of conjunctive parts described and claimed, and my main object being to facilitate manipulation of all the members and parts involved in the suspensive operation in an effective manner, as hereinafter fully set forth.

In the accompanying drawings,

Fig. 3, is a side elevation of a clamping jaw and stirrup combined, as in Fig. 2;

Fig. 4, is a face elevation thereof, taken on a plane at right angles to Fig. 3;

Fig. 5, shows a section of one of the jaws and a cross section of the coupling bar, the parts being represented in locked relationship;

Fig. 6, is a section taken upon plane of line 6—6, Fig. 5;

Fig. 7, is a view like unto Fig. 5, but with the coupling bar in unlocked position;

Fig. 8, is a section taken upon plane of line 8—8, Fig. 7;

Fig. 9, is a side elevation of the form of coupling member with stirrup, as shown in Fig. 1, but upon a reduced scale;

Fig. 10, is a view taken at right angles to Fig. 9;

Fig. 11, is a side elevation of the coupling member shown in Fig. 2, on a reduced scale;

Fig. 12, is an elevation thereof, taken at right angles to Fig. 11;

Fig. 13, is an end elevation of the coupling shown in Fig. 1, illustrating the unlocking of the parts.

Figure 1:
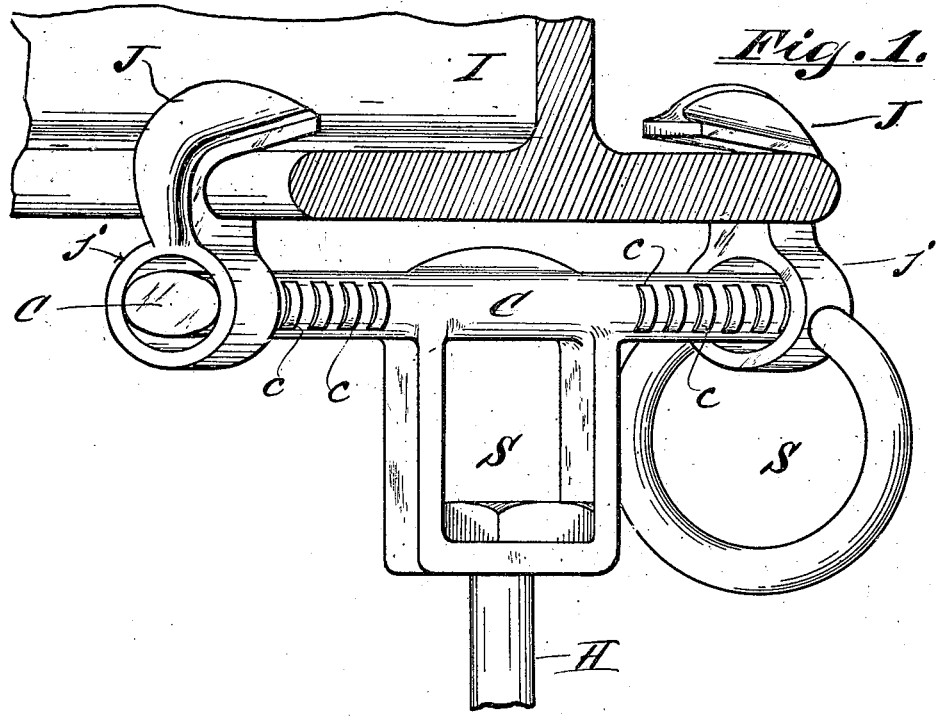
Fig. 1 is a perspective view of one embodiment of the essential features of my invention in which the suspender stirrup forms part of the jaw coupling member of the clamp.
Figure 2:
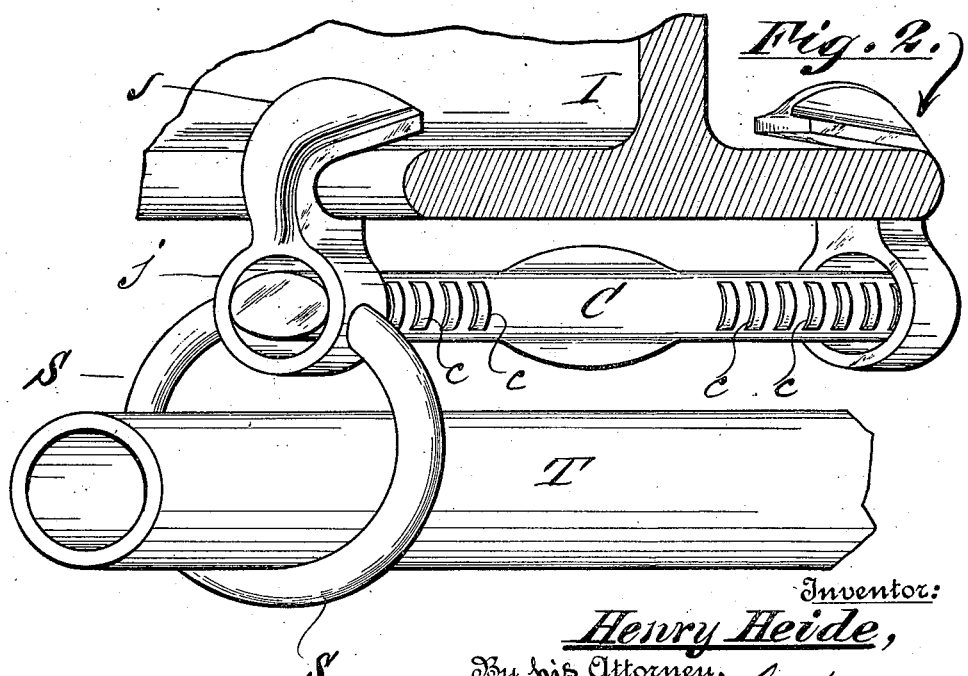
Fig. 2, is a similar view showing a modification in which the stirrup forms part of one of the clamping jaws.

In its simplest form my device consists of a coupling member C of oval shape in the form seen in Figures 1 and 2, formed with peripheral segmental rack teeth $c$, $c$, and a pair of clamping jaws J, J, formed with shank sockets $j$, $j$, each having internal segmental rack teeth $j'$, $j'$, corresponding to the segmental rack teeth $c$, $c$, on the coupling member C. The rack teeth in each case are preferably formed in diametrically opposed series. That is to say, the rack teeth $c$, $c$, on the coupling member are formed in parallel peripheral series on opposite sides thereof, and at both extremities thereof, and in like manner the socket rack teeth $j'$, $j'$, are formed in diametrically opposed parallel series on the interior concave surfaces of the sockets $j$, $j$.

The length of the rack teeth is in each case less than one half the circumference of the annular surface on which they are projected, preferably about one fourth of a circle, and they extend vertically as related to the normal positions of the parts of which they form a component part.

Thus by turning the coupling member C, on its longitudinal axis at right angles to its normal position its racked ends may be readily inserted in the jaw sockets $j$, $j$, so that when returned to normal position its rack teeth $c$, $c$, will interlock with the rack teeth $j'$, $j'$ in said jaw sockets. Thus in Figs. 7 and 8 the operation of insertion is illustrated, whereas in the corresponding Figs. 5 and 6, the copulation is shown. Obviously, to release the interlocked parts the operation is reversed.

Either the coupling member C, or one or both of the jaws J, J, may be formed with stirrups S, S, for the pendent support of a headed vertical suspender rod or hanger as H, Fig. 1, or for tubing T, as indicated in Fig. 2, of the drawings.

The stirrup S, on the jaw J, may be used for the support of the end of a pipe or rod, while the stirrup S, on the coupling rod C, is in use for the support of a suspender H, without interfering with the function of either, as will be understood by reference more particularly to Figs. 1, of the drawings.

Thus constructed and arranged, my clamping device is adapted to numerous useful purposes, both for use as a temporary expedient and suspensive support for various articles, as during building operations, or as a permanent fixture for the hanging of pipes, rods and other fixtures.

It is both simple and cheap of structure, and easily manipulatable, and forms a positive lock when the parts are coupled together as herein set forth.

What I claim as my invention and desire to secure by Letters Patent is,

The suspender clamp described consisting of a coupling member oval in cross section having peripheral segmental rack teeth and an integral depending stirrup between said teeth, and a pair of clamping jaws having sockets with internal segmental rack teeth for engagement with the teeth of the coupling member, the length of said rack teeth being less than one half the circumference of the member on which they are projected, said coupling member being rotatable for interlocking engagement or disengagement of the teeth of said member and the sockets.

HENRY HEIDE.

Witnesses:
GEO. WM. MIATT,
LILLIA MIATT CARTER.